United States Patent
Manickam et al.

(10) Patent No.: US 11,716,279 B2
(45) Date of Patent: *Aug. 1, 2023

(54) SYSTEMS AND METHODS FOR DETERMINING FHRP SWITCHOVER

(71) Applicant: Cisco Technology, Inc., San Jose, CA (US)

(72) Inventors: Arul Murugan Manickam, San Jose, CA (US); Basavaraju M. Halappa, San Jose, CA (US); Prasad Chigurupati, Fremont, CA (US); Aashiha Priyadarshni Lakshmi Kumar, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/681,911

(22) Filed: Feb. 28, 2022

(65) Prior Publication Data

US 2022/0182313 A1 Jun. 9, 2022

Related U.S. Application Data

(63) Continuation of application No. 16/997,203, filed on Aug. 19, 2020, now Pat. No. 11,265,240.

(51) Int. Cl.
*H04L 45/30* (2022.01)
*H04L 47/2425* (2022.01)
(Continued)

(52) U.S. Cl.
CPC ............ *H04L 45/306* (2013.01); *H04L 43/16* (2013.01); *H04L 45/308* (2013.01); *H04L 47/2425* (2013.01)

(58) Field of Classification Search
CPC ..... H04L 43/16; H04L 45/306; H04L 45/308; H04L 47/2425

See application file for complete search history.

(56) References Cited

U.S. PATENT DOCUMENTS

| 7,702,732 B1 | 4/2010 | Squire |
| 9,055,139 B1 | 6/2015 | Devireddy |

(Continued)

FOREIGN PATENT DOCUMENTS

CN 106100987 A 11/2016

OTHER PUBLICATIONS

Shahriar et al., "Designing a reliable and redundant network for multiple VLANs with Spanning Tree Protocol (STP) and Fast Hop Redundancy Protocol (FHRP)," Proceedings of the International Conference on Industrial Engineering and Operations Management Washington DC, USA, Sep. 27-29, 2018 (Year: 2018).*

(Continued)

*Primary Examiner* — Kostas J Katsikis
(74) *Attorney, Agent, or Firm* — Baker Botts L.L.P.

(57) ABSTRACT

In one embodiment, a method includes determining, by a first router, service level agreement (SLA) requirements for an application and generating, by the first router, first SLA characteristics for the first router. The first router is in an active mode within a network. The method also includes comparing, by the first router, the first SLA characteristics for the first router to the SLA requirements and determining, by the first router, second SLA characteristics for a second router. The second router is in a standby mode within the network. The method further includes comparing, by the first router, the second SLA characteristics for the second router to the SLA requirements and determining, by the first router, whether to lower a first hop redundancy protocol (FHRP) priority of the first router.

20 Claims, 3 Drawing Sheets

(51) Int. Cl.
*H04L 43/16* (2022.01)
*H04L 45/302* (2022.01)

(56) References Cited

U.S. PATENT DOCUMENTS

| | | |
|---|---|---|
| 9,571,603 B2* | 2/2017 | Evens ................. H04L 67/1034 |
| 9,906,402 B2 | 2/2018 | Ramachandran et al. |
| 10,210,058 B1 | 2/2019 | Srinath et al. |
| 10,567,252 B1 | 2/2020 | Mukhopadhyaya et al. |
| 10,681,091 B2 | 6/2020 | Srinath et al. |
| 2011/0242968 A1 | 10/2011 | Cirkovic |
| 2015/0117179 A1 | 4/2015 | Sato |
| 2015/0200839 A1 | 7/2015 | Huang |
| 2015/0333953 A1 | 11/2015 | Vasseur |
| 2017/0171056 A1* | 6/2017 | Dong ....................... H04L 12/66 |
| 2019/0028577 A1 | 1/2019 | Dsouza |
| 2019/0036814 A1 | 1/2019 | Aranha |

OTHER PUBLICATIONS

Cisco, "Cisco SD-WAN Design Guide," May 2020, 102 pages.

* cited by examiner

SYSTEMS AND METHODS FOR DETERMINING FHRP SWITCHOVER

PRIORITY

This application is a continuation under 35 U.S.C. § 120 of U.S. patent application Ser. No. 16/997,203 filed Aug. 19, 2020, which is a utility filing entitled "SYSTEMS AND METHODS FOR DETERMINING FHRP SWITCHOVER," which is hereby incorporated by reference in its entirety.

TECHNICAL FIELD

The present disclosure relates generally to network switchovers, and more specifically to systems and methods for determining First Hop Redundancy Protocol (FHRP) switchover.

BACKGROUND

Application-aware routing (AAR) tracks network and path characteristics between network components and uses the collected information to compute optimal paths for data traffic. The path taken by application data traffic through the network may be directed to network links that support the application's performance requirements. If performance issues are discovered from the collected information, the application data traffic may be dropped or take a worst path.

DESCRIPTION OF EXAMPLE EMBODIMENTS

Overview

According to an embodiment, a first router includes one or more processors and one or more computer-readable non-transitory storage media coupled to the one or more processors. The one or more computer-readable non-transitory storage media include instructions that, when executed by the one or more processors, cause the first router to perform operations including determining service level agreement (SLA) requirements for an application and generating first SLA characteristics for the first router. The first router may be in an active mode within a network. The operations also include comparing the first SLA characteristics for the first router to the SLA requirements and determining second SLA characteristics for a second router. The second router may be in a standby mode within the network. The operations further include comparing the second SLA characteristics for the second router to the SLA requirements and determining whether to lower an FHRP priority of the first router.

In certain embodiments, the operations include determining that the first SLA characteristics for the first router fail to satisfy the SLA requirements, determining that the second SLA characteristics for the second router satisfy the SLA requirements, lowering the FHRP priority of the first router such that the FHRP priority of the first router is less than the FHRP priority of the second router, and switching, based on the FHRP priority of the first router and the second router, the first router from the active mode to the standby mode within the network.

In some embodiments, the operations include determining that transport location (TLOC) extensions are configured between the first router and the second router, determining to switch, based on the FHRP priority of the first router being less than the FHRP priority of the second router, the second router from the standby mode to the active mode within the network, and determining to increase a TLOC preference for the second router.

In certain embodiments, the operations include, while the first router is in the active mode: receiving outgoing traffic associated with the application from a host server, communicating the outgoing traffic associated with the application to a destination server, receiving incoming traffic from the destination server, and communicating the incoming traffic to the host server.

In some embodiments, the operations include determining that the first SLA characteristics for the first router fail to satisfy the SLA requirements, determining that the second SLA characteristics for the second router fail to satisfy the SLA requirements, and lowering the FHRP priority of the first router such that the FHRP priority of the first router and the FHRP priority of the second are set to a same value.

In certain embodiments, the SLA requirements comprise threshold values for jitter, latency, and packet loss, and the first SLA characteristics and the second SLA characteristics include performance metrics associated with jitter, latency, and packet loss. In some embodiments, the network is a software-defined wide area network (SD-WAN), the FHRP priority is a Virtual Router Redundancy Protocol (VRRP) priority, and/or the first router and the second router are located in a data center.

According to another embodiment, a method includes determining, by a first router, SLA requirements for an application and generating, by the first router, first SLA characteristics for the first router. The first router may be in an active mode within a network. The method also includes comparing, by the first router, the first SLA characteristics for the first router to the SLA requirements and determining, by the first router, second SLA characteristics for a second router. The second router may be in a standby mode within the network. The method further includes comparing, by the first router, the second SLA characteristics for the second router to the SLA requirements and determining, by the first router, whether to lower a FHRP priority of the first router.

According to yet another embodiment, one or more computer-readable non-transitory storage media embody instructions that, when executed by a processor, cause the processor to perform operations including determining service level agreement (SLA) requirements for an application and generating first SLA characteristics for a first router. The first router may be in an active mode within a network. The operations also include comparing the first SLA characteristics for the first router to the SLA requirements and determining second SLA characteristics for a second router. The second router may be in a standby mode within the network. The operations further include comparing the second SLA characteristics for the second router to the SLA requirements and determining whether to lower a FHRP priority of the first router.

Technical advantages of certain embodiments of this disclosure may include one or more of the following. This disclosure describes systems and methods for determining FHRP switchover based on network tunnel SLA characteristics, which may prevent application data traffic from being dropped or taking a worst path. For example, if the SLA characteristics for an active router within a network fail to satisfy the SLA requirements associated with an application, but the SLA characteristics for a standby router within the network satisfy the SLA requirements, the FHRP priority of the active router may be lowered to initiate an FHRP switchover between the active router and the standby router. Certain systems and methods described herein prevent/reduce asymmetric routing by directing outgoing and incoming traffic through the same network path. For example, in certain systems and methods described herein, a TLOC preference may be increased for a newly assigned active router after the occurrence of an FHRP switchover such that the newly assigned active router can attract WAN-side traffic.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

Figure 1:
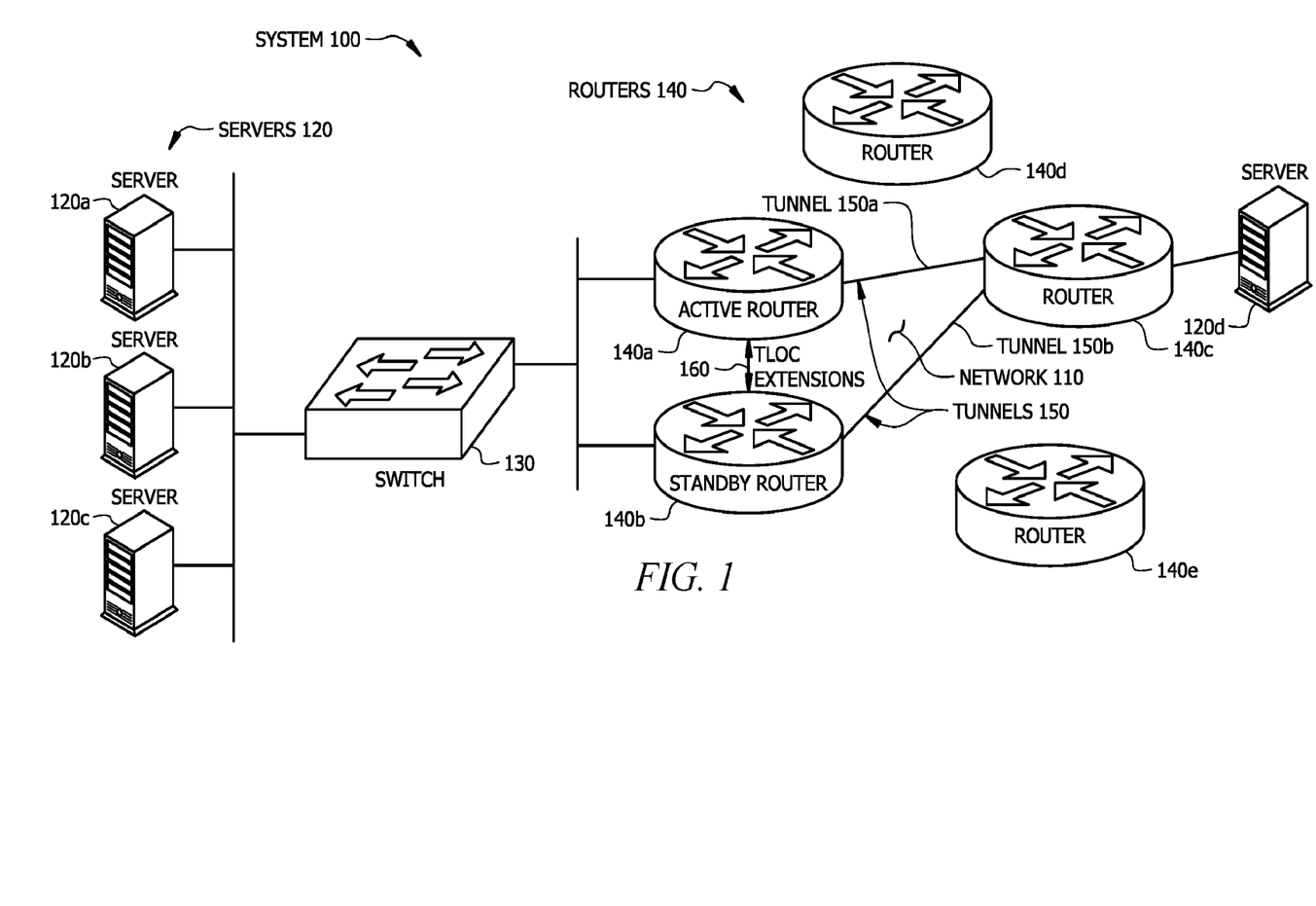
FIG. 1 illustrates an example system for determining FHRP switchover.
Figure 2:
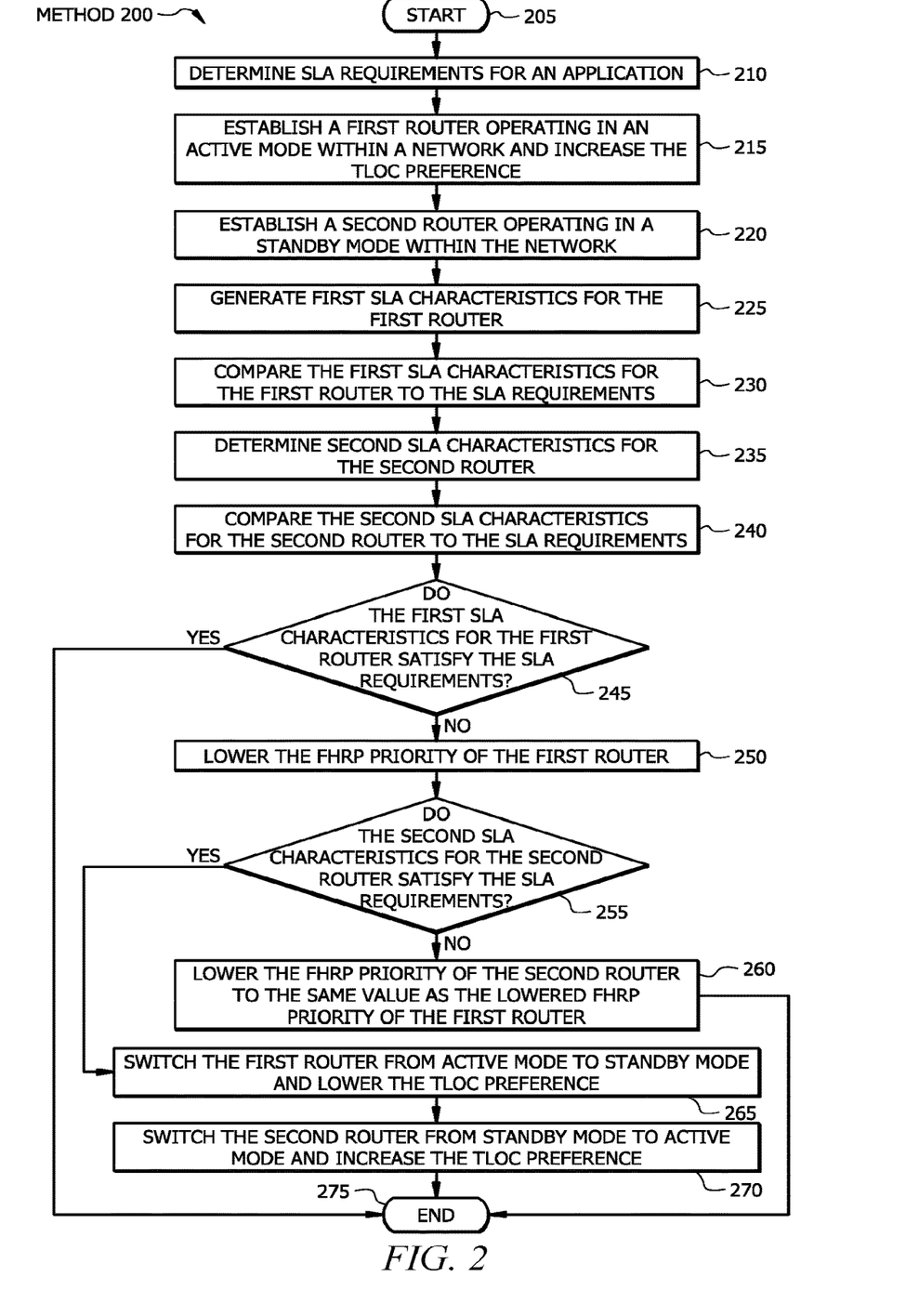
FIG. 2 illustrates an example method for determining FHRP switchover.
Figure 3:
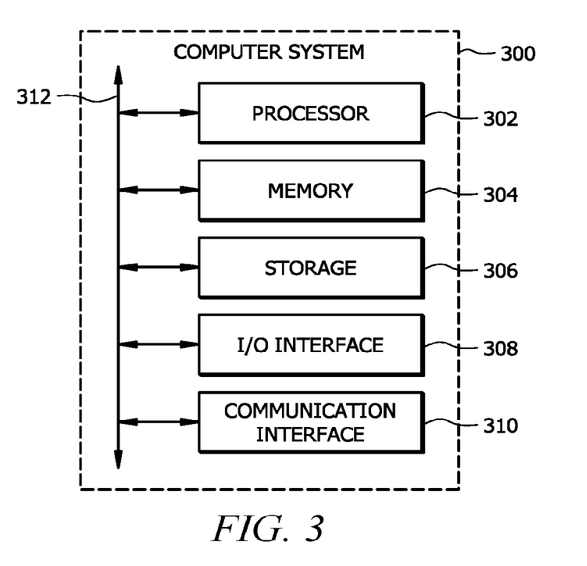
FIG. 3 illustrates an example computer system that may be used by the systems and methods described herein.

This disclosure describes systems and methods for determining FHRP switchover. FHRP is a computer networking protocol that allows two or more routers to provide backup for an active router. One router within the network is designated as an active router and at least one other router within the network is designated as a standby router. If the active router fails and/or underperforms, the standby router takes over the network address. FIG. 1 shows an example system for determining FHRP switchover, and FIG. 2 shows an example method for FHRP switchover. FIG. 3 shows an example computer system that may be used by the systems and methods described herein.

FIG. 1 illustrates an example system 100 for determining FHRP switchover. System 100 or portions thereof may be associated with an entity, which may include any entity, such as a business or company that determines FHRP switchover. The components of system 100 may include any suitable combination of hardware, firmware, and software. For example, the components of system 100 may use one or more elements of the computer system of FIG. 3. System 100 of FIG. 1 includes a network 110, servers 120, a switch 130, routers 140, tunnels 150, and TLOC extensions 160.

Network 110 of system 100 is any type of network that facilitates communication between components of system 100. Network 110 may connect one or more components of system 100. One or more portions of network 110 may include an ad-hoc network, an intranet, an extranet, a virtual private network (VPN), a local area network (LAN), a wireless LAN (WLAN), a wide area network (WAN), a wireless WAN (WWAN), an SD-WAN, a metropolitan area network (MAN), a portion of the Internet, a portion of the Public Switched Telephone Network (PSTN), a cellular telephone network, a Digital Subscriber Line (DSL), a 3G network, a 4G network, a 5G network, a Long Term Evolution (LTE) network, a combination of two or more of these, or other suitable types of networks. Network 110 may include one or more different types of networks. Network 110 may be any communications network, such as a private network, a public network, a connection through Internet, a mobile network, a WI-FI network, etc. One or more components of system 100 may communicate over network 110. Network 110 may include a core network (e.g., the Internet), an access network of a service provider, an Internet service provider (ISP) network, and the like. In the illustrated embodiment of FIG. 1, network 110 is an SD-WAN.

Servers 120 of system 100 represent any suitable network components that can manage network resources. Servers 120 may include one or more network servers, database servers, print servers, file servers, a combination thereof, or any other suitable type of server. In certain embodiments, servers 120 receive, create, process, store, and/or send traffic to other components within network 110. Servers 120 may be controlled by an entity (e.g., a network service provider). In the illustrated embodiment of FIG. 1, servers 120 include server 120*a*, server 120*b*, server 120*c*, server 120*d*, and server 120*e*. One or more servers 120 may operate as host servers or destination servers. For example, servers 120*a*, 120*b*, and 120*c* may operate as host servers within network 110, and server 120*d* may operate as a destination server within network 110. In certain embodiments, a host server requests services (e.g., application services) from one or more components of system 100, and a destination server provides the requested services to the host server. For example, server 120*a* of system 100 may act as a host server and transmit a request via network 110 for an application service, and server 120*d* of system 100 may act as a destination server to provide the requested application service to server 120*a* via network 110.

Switch 130 of system 100 represents any suitable network component that can connect devices on network 110. In certain embodiments, switch 130 connects components within network 110 by using packet switching to receive and forward data to a destination component. For example, switch 130 may receive data packets from server 120*a* and communicate the data packets (via one or more routers 140) to server 120*d*. As another example, switch 130 may receive data packets from server 120*d* (via one or more routers 140) and communicate the data packets to server 120*a*. Switch 130 may receive, create, process, store, and/or send traffic to other components within network 110. Switch 130 may be controlled by an entity (e.g., a network service provider).

Routers 140 of system 100 represent any suitable network components that can forward data packets between components of network 110. Routers 140 may include one or more edge routers (e.g., a subscriber edge router, a label edge router, etc.), Border Gateway Protocol (BGP) routers, wired routers, wireless routers, virtual routers, core routers, gateways, a combination thereof, or any other suitable types of routers. In certain embodiments, routers 140 receive, create, process, store, and/or send traffic to other components within network 110. One or more routers 140 may be controlled by one or more entities (e.g., a network service provider). In the illustrated embodiment of FIG. 1, routers 140 include active router 140*a*, standby router 140*b*, router 140*c*, router 140*d*, and router 140*e*. One or more routers 140 may be located in one or more data centers, remote branches, or any other suitable location. For example, active router 140*a* and standby router 140*b* may be located in a data center, and routers 140*c*, 140*d*, and 140*e* may be located in a remote branch. A data center is a building, a group of buildings, or a dedicated space within a building that houses computer components (e.g., routers, servers, etc.). A remote branch is a site located at a predetermined distance from an organization's headquarters or main office.

In certain embodiments, one or more routers 140 within network 110 may be designated as an active router or a standby router. For example, active router 140*a* may be designated as an active router such that active router 140*a* operates in an active mode. Active mode indicates that router 140 is receiving and forwarding particular traffic (e.g., application data traffic) within network 110. As another example, standby router 140b may be designated as a standby router such that standby router 140b operates in a standby (e.g., bypass) mode. Standby mode indicates that router 140 is not receiving and forwarding particular traffic (e.g., application data traffic) within network 110. Active router 140a, while operating in active mode, may forward packets (e.g., Internet Protocol (IP) packets) from a host server (e.g., server 120a, server 120b, or server 120c) to a destination server (e.g., server 120d). Standby router, while operating in standby mode, serves as a backup to active router 140a. For example, if active router 140a fails to satisfy one or more requirements (e.g., SLA requirements), standby router 140b may be configured to have a higher FHRP priority than active router 140a to initiate a switchover between active router 140a and standby router 140b. After the switchover occurs, standby router 140b operates in active mode to provide uninterrupted service for the host server.

In certain embodiments, active router 140a and standby router 140b are part of an IP routing redundancy group. In some embodiments, active router 140a and standby router 140b may share a single, virtual IP address that is configured on each end user's device as a default gateway address. Active router 140a may be initially elected to handle all requests sent to the virtual IP address, and standby router 140b may serve as a backup to active router 140a. Router 140c, router 140d, and router 140e may be located remotely (e.g., in another data center, branch office, city, state, and/or country) from active router 140a and standby router 140b. For example, active router 140a and standby router 140b may be located in a data center or branch office in San Francisco, router 140c may be located in London, router 140d may be located in Paris, and router 140e may be located in Bangalore.

In some embodiments, active router 140a (while in active mode) receives outgoing traffic associated with an application from a host server (e.g., server 120a, server 120b, or server 120c) and communicates the outgoing traffic associated with the application to a destination server (e.g., server 120d). In certain embodiments, active router 140a (while in active mode) receives incoming traffic from destination server 120d and communicates the incoming traffic to host server (e.g., server 120a, server 120b, or server 120c). As such, symmetric routing is provided for the outgoing and incoming traffic since the traffic follows the same path through active router 140a, round trip.

In certain embodiments, TLOC extensions 160 are configured between one or more routers 140. A TLOC is an attachment point where router 140 (e.g., a WAN edge router) connects to network 110 (e.g., a WAN transport network). In certain embodiments, the TLOC is uniquely identified and represented by a three-tuple (i.e., a system IP address, link color, and encapsulation (Generic Routing Encapsulation (GRE), IPsec, etc.)). A TLOC preference for one or more TLOCs may be set to a specific value to influence traffic flow. For example, in the event that active router 140a and standby router 140b switch modes such that standby router 140b operates in active mode and active router 140a operates in standby (e.g., bypass) mode, the TLOC preference for standby router 140b may be increased by a predetermined value (e.g., 1, 10, 20, etc.) to attract WAN-side traffic (e.g., traffic from destination server 120d) directly to standby router 140b. As such, symmetric routing is provided for the traffic since the traffic follows the same path through standby router 140b, round trip.

In some embodiments, FHRP is configured on one or more routers 140. For example, FHRP may be configured on active router 140a and standby router 140b to attract LAN-side traffic. In certain embodiments, FHRP is used for site redundancy and acts as a default gateway for servers 120. Examples of FHRP include VRRP, Hot Standby Router Protocol (HSRP), Common Address Redundancy Protocol (CARP), Extreme Standby Router Protocol (ESRP), Gateway Load Balancing Protocol (GLBP), Routed Split multi-link trunking (R-SMLT), NetScreen Redundancy Protocol (NSRP), and Chassis Cluster Redundant Ethernet.

In certain embodiments, an FHRP priority (e.g., a VRRP priority) from 1 to 254 (100 may be the default) is configured on one or more routers 140. In certain embodiments, router 140 with the highest FHRP priority within a redundancy group is elected as active (e.g., master) FHRP router. For example, if active router 140a has an FHRP priority of 100 and standby router 140b has an FHRP priority of 90, active router 140a may be elected as active FHRP router. As another example, if active router 140a has an FHRP priority of 90 and standby router 140b has an FHRP priority of 100, a switchover may occur such that active router 140a operates in standby (e.g., bypass) mode and standby router 140b operates in active (e.g., master) mode. If the FHRP priority of active router 140a and standby router 140b is the same, then router 140 with the higher IP address (e.g., LAN IP address) may be elected active router.

One or more portions of system 100 may implement AAR. In certain embodiments, an AAR policy, which is a type of centralized data policy, is configured on a controller (e.g., a smart controller) within system 100. The controller may automatically push the AAR policy to one or more routers 140. In certain embodiments, AAR may be configured on one or more tunnels 150 between routers 140. Tunnels 150 are point-to-point links between components of network 110. In certain embodiments, tunnels 150 allow private network data to be communicated across a public network (e.g., the Internet). Tunnels 150 may include one or more SD-WAN tunnels, VPN tunnels, IP Security (IPSec) tunnels, SLA tunnels, GRE tunnels, a combination thereof, or any other suitable type of tunnel. In the illustrated embodiment of FIG. 1, tunnels 150 include tunnel 150a and tunnel 150b. Tunnel 150a provides a link between active router 140a and router 140c of network 110. Tunnel 150b provides a link between standby router 140b and router 140c of network 110.

AAR tracks network and path characteristics. The network and path characteristics may include packet loss, latency, jitter, a load of a link, a cost of a link, the bandwidth of a link, and/or any other suitable network or path characteristic. The AAR characteristics may be used to compute optimal paths for data traffic in network 110. The network and path characteristics may supplement standard routing parameters (e.g., route prefixes, metrics, link-state information, etc.) in determining traffic paths through network 110.

In certain embodiments, the AAR policy specifies performance characteristics (e.g., data plane tunnel performance characteristics) in the form an SLA. SLA defines the required packet loss, latency, and/or jitter conditions on a data plane connection that trigger the policy to take effect. AAR may be created/configured as follows: (1) configure an SLA class, which defines the required latency and loss for the traffic that is to be affected by a given application-aware routing policy; (2) configure an AAR policy, which specifies the traffic that is to belong to the SLA class; and (3) apply the AAR policy towards the desired overlay network sites.

In some embodiments, AAR directs traffic based on an application's predetermined SLA and/or application profiles (e.g., user-defined application profiles). For example, traffic may be sent to tunnels 150 within network 110 that have the required SLA characteristics to support an application. The SLA characteristics may include measurements for packet loss, latency, packet sequencing, connectivity, network availability, network performance, Domain Name System (DNS) lookup time, etc. In certain embodiments, AAR tracks the SLA characteristics of tunnels 150 (e.g., data plane SD-WAN tunnels) between routers 140 (e.g., SD-WAN routers). The collected SLA characteristics may be used to compute optimal paths for data traffic. In certain embodiments, the SLA characteristics are tracked, measured, and/or recorded by Bidirectional Forwarding Detection (BFD). In certain embodiments, an SLA next hop may be chosen for a given application based on the SLA characteristics associated with tunnels 150.

In certain embodiments, one or more routers 140 may determine SLA characteristics for its associated tunnels 150. For example, active router 140a may measure SLA characteristics (e.g., loss, latency, and jitter) for tunnel 150a located between active router 140a and router 140c. As another example, standby router 140b may measure SLA characteristics (e.g., loss, latency, and jitter) for tunnel 150b located between standby router 140b and router 140c. One or more routers 140 of system 100 may determine SLA characteristics for its associated tunnels 150 in real-time, near real-time, or in any suitable interval (e.g., 1 second, 10 seconds, 10 minutes, etc.).

In certain embodiments, active router 140a determines SLA requirements for an application. The SLA requirements may provide a form of guarantee to customers with regard to a level of user experience. The SLA requirements may be specific to each application. For example, different types of applications (e.g., business-critical applications, enterprise resource management applications, customer relationship management applications, material requirements planning (mrp) applications, portals, client-server applications, etc.) may have different SLA requirements based on different business objectives. The SLA requirements may include requirements (e.g., threshold values) for delay, packet loss, jitter, packet sequencing, connectivity, network availability, network performance, DNS lookup time, and the like.

Active router 140a may determine SLA characteristics associated with tunnel 150a for active router 140a. Active router 140a may compare the SLA characteristics for active router 140a to the SLA requirements. Active router 140a may determine SLA characteristics associated with tunnel 150b for standby router 140b. Active router 140a may compare the SLA characteristics for standby router 140b to the SLA requirements. Active router 140a may then determine, based on the comparisons, which SLA characteristics satisfy the SLA requirements. Based on this determination, active router 140a may decide whether to lower its FHRP priority (e.g., VRRP priority).

In certain embodiments, active router 140a determines that the SLA characteristics for active router 140a fail to satisfy the SLA requirements, and that the SLA characteristics for standby router 140b satisfy the SLA requirements. In response to this determination, the FHRP priority of active router 140a may be lowered by one or more components of system 100. For example, the FHRP priority of active router 140a may be lowered by an increment of 10 from a first configured value (e.g., 100) to a second configured value (e.g., 90).

In certain embodiments, lowering the VRRP priority of active router 140a switches active router 140a from active (e.g., master) mode to standby (e.g., bypass) mode within network 110. For example, if the VRRP priority of active router 140a is lowered to a value that is less than the VRRP priority of standby router 140b, active router 140a may automatically switch from active to standby mode, and standby router 140b may automatically switch from standby to active mode.

In certain embodiments, if TLOC extensions are configured between active router 140a and standby router 140b, the TLOC preference for standby router 140b may be increased such that standby router 140b attracts WAN-side traffic directly while standby router 140b is operating in active mode. For example, network traffic may flow from host server 120a, through standby router 140b, through router 140c, and to server 120d. The network traffic may then flow in reverse from destination server 120d, through router 140c, through standby router 140b, and to host server 120a without passing through active router 140a, which provides for symmetrical routing.

In some embodiments, one or more network components of system 100 (e.g., active router 140a) determines that the SLA characteristics for active router 140a fail to satisfy the SLA requirements, and that the SLA characteristics for standby router 140b also fail to satisfy the SLA requirements. In response to this determination, one or more network components of system 100 may set the FHRP priority of active router 140a and the FHRP priority of standby router 140b to a same value. For example, one or more network components of system 100 may lower the FHRP priority of active router 140a to a particular value such that the FHRP priority of active router 140a (e.g., 90) and the FHRP priority of standby router 140b 9 (e.g., 90) are the same. Setting the FHRP priorities of active router 140a and standby router 140b to the same value allows an FHRP election algorithm to automatically designate active router 140a and standby router 140b as either active or standby.

In operation, the FHRP priorities for active router 140a and standby router 140b of system 100 are each initially set to 100. An FHRP election algorithm elects active router 140a as the active (e.g., master) router and standby router 140b as the standby (e.g., bypass) router. Active router 140a determines SLA requirements (e.g., threshold values for jitter, latency, and packet loss) for an application. Active router 140a determines SLA characteristics associated with active router 140a. For example, active router 140a may determine performance metrics for jitter, latency, and packet loss) for tunnel 150a located between active router 140a and router 140c of system 100. Active router 140a compares the SLA characteristics associated with active router 140a to the SLA requirements and determines that the SLA characteristics associated with active router 140a fail to satisfy the SLA requirements. Active router 140a determines SLA characteristics associated with standby router 140b, compares the SLA characteristics associated with standby router 140b to the SLA requirements, and determines that the SLA characteristics associated with standby router 140b satisfy the SLA requirements. In response to these determinations, active router 140a lowers its FHRP priority to a value lower than the FHRP priority value of standby router 140b, which initiates an FHRP switchover. After the switchover, active router 140a becomes standby and standby router 140b becomes active within network 110. If TLOC extensions are configured between active router 140a and standby router 140b, the TLOC preference of standby router 140b is increased by a predetermined value (e.g., 20) to attract WAN-side traffic (e.g., traffic from router 140c) to standby router 140b, which may provide for symmetric routing.

Although FIG. 1 illustrates a particular arrangement of network 110, servers 120, switch 130, routers 140, tunnels 150, and TLOC extensions 160, this disclosure contemplates any suitable arrangement of network 110, servers 120, switch 130, routers 140, tunnels 150, and TLOC extensions 160. For example, server 120d may be connected to router 140d or router 140e. As another example, in certain embodiments, active router 140a may operate as a standby router. As still another example, standby router 140b may operate as an active router. Although FIG. 1 illustrates a particular number of networks 110, servers 120, switches 130, routers 140, tunnels 150, and TLOC extensions 160, this disclosure contemplates any suitable number of networks 110, servers 120, switches 130, routers 140, tunnels 150, and TLOC extensions 160. For example, system 100 may include more or less than three servers 120, more than one switch 130, and/or more than five routers 140.

FIG. 2 illustrates an example method 200 for determining a FHRP switchover. Method 200 begins at step 205. At step 210, a network component (e.g., active router 140a of FIG. 1) determines SLA requirements for an application. The SLA requirements may include threshold values for jitter, latency, and packet loss for the application. Method 200 then moves from step 210 to step 215, where the network component establishes a first router (e.g., active router 140a of FIG. 1) operating in an active (e.g., master) mode within a network (e.g., network 110 of FIG. 1). In certain embodiments, the network component increases the TLOC preference of the first router. For example, the network component may increase the TLOC preference from a TLOC default value (e.g., 1) to the TLOC default value plus 1 (e.g., 2). Method 200 then moves from step 215 to step 220.

At step 220 of method 200, the network component establishes a second router (e.g., standby router 140b of FIG. 1) operating in a standby (e.g., bypass) mode within the network. In certain embodiments, the TLOC preference of the second router is the TLOC default value (e.g., 1). Method 200 then moves from step 220 to step 225, where the network component generates first SLA characteristics for the first router while the first router is operating in active mode within the network. The first router may have an FHRP priority (e.g., a VRRP priority) set to a first predetermined value (e.g., 100). The first SLA characteristics may include performance metrics associated with jitter, latency, and packet loss for one or more tunnels (e.g., tunnel 150a of FIG. 1) associated with the first router. Method 200 then moves from step 225 to step 230, where the network component compares the first SLA characteristics for the first router to the SLA requirements. Method 200 then moves from step 230 to step 235.

At step 235 of method 200, the network component determines second SLA characteristics for the second router while the second router is operating in standby (e.g., bypass) mode within the network. The second SLA characteristics may include performance metrics associated with jitter, latency, and packet loss for one or more tunnels (e.g., tunnel 150b of FIG. 1) associated with the second router. The second router may have an FHRP priority (e.g., a VRRP priority) set to the first predetermined value (e.g., 100). Method 200 then moves from step 235 to step 240, where the network component compares the second SLA characteristics for the second router to the SLA requirements. Method 200 then moves from step 240 to step 245.

At step 245 of method 200, the network component determines whether the first SLA characteristics for the first router satisfy the SLA requirements. If the network component determines that the first SLA characteristics for the first router satisfy the SLA requirements, method 200 advances from step 245 to step 275, where method 200 ends. If, at step 245, the network component determines that the first SLA characteristics for the first router fail to satisfy the SLA requirements, method 200 moves from step 245 to step 250, where the network component lowers the FHRP priority of the first router. For example, the network component may lower the FHRP priority of the first router from the first predetermined value (e.g., 100) to a second predetermined value (e.g., 90). Method 200 then moves from step 250 to step 255.

At step 255 of method 200, the network component determines whether the second SLA characteristics for the second router satisfy the SLA requirements. If the network component determines that the second SLA characteristics for the second router fail to satisfy the SLA requirements, method 200 movers from step 255 to step 260, where the network component lowers the FHRP priority of the second router. For example, the network component may lower the FHRP priority of the second router from the first predetermined value (e.g., 100) to the second predetermined value (e.g., 90) such the that FHRP priority of the second router is set to the same value as the FHRP priority of the first router. Setting the VRRP priorities to the same value allows the FHRP election algorithm to automatically designate the first router and the second router as active/standby. Method 200 then moves from step 265 to step 275, where method 200 ends.

If, at step 255, the second SLA characteristics for the second router satisfy the SLA requirements, an FHRP switchover is initiated in response to the FHRP priority of the first router being less than the FHRP priority of the second router. Method 200 advances from step 255 to step 265, where the first router automatically switches from active (e.g., master) mode to standby (e.g., bypass) mode. In certain embodiments, at step 265, the network component lowers the TLOC preference of the first router. For example, the network component may lower the TLOC preference from the TLOC default value plus 1 (e.g., 2) to the TLOC default value (e.g., 1). Method 200 moves from step 265 to step 270, where the second router automatically switches from standby (e.g., bypass) mode to active (e.g., master) mode. In certain embodiments, at step 270, the network component increases the TLOC preference of the second router. For example, the network component may increase the TLOC preference from the TLOC default value (e.g., 1) to the TLOC default value plus 1 (e.g., 2). Increasing the TLOC preference for the second router to a value higher than the TLOC preference of the first router allows the second router to attract WAN-side traffic while the second router is in active mode, which may provide for symmetric routing. Method 200 then moves from step 270 to step 275, where method 200 ends.

Although this disclosure describes and illustrates particular steps of the method of FIG. 2 as occurring in a particular order, this disclosure contemplates any suitable steps of the method of FIG. 2 occurring in any suitable order. For example, steps 265 and 270 may be switched, or may occur simultaneously, in certain embodiments. Moreover, although this disclosure describes and illustrates an example method for determining FHRP switchover including the particular steps of the method of FIG. 2, this disclosure contemplates any suitable method for determining FHRP switchover including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A first router, comprising:
one or more processors; and
one or more computer-readable non-transitory storage media coupled to the one or more processors and comprising instructions that, when executed by the one or more processors, cause the first router within a network to perform operations comprising:
determining service level agreement (SLA) requirements for an application;
determining first SLA characteristics for the first router;
determining that the first SLA characteristics for the first router fail to satisfy the SLA requirements; and
determining, in response to determining that the first SLA characteristics for the first router fail to satisfy the SLA requirements, to lower a first hop redundancy protocol (FHRP) priority of the first router.

2. The first router of claim 1, the operations further comprising:
determining that second SLA characteristics for a second router satisfy the SLA requirements;
lowering the FHRP priority of the first router such that the FHRP priority of the first router is less than the FHRP priority of the second router; and
switching, based on the FHRP priority of the first router and the second router, the first router from an active mode to a standby mode within the network.

3. The first router of claim 2, the operations further comprising:
determining that transport location (TLOC) extensions are configured between the first router and the second router;
determining to switch, based on the FHRP priority of the first router being less than the FHRP priority of the second router, the second router from the standby mode to the active mode within the network; and
determining to increase a TLOC preference for the second router.

4. The first router of claim 1, the operations further comprising, while the first router is in an active mode:
receiving outgoing traffic associated with the application from a host server;
communicating the outgoing traffic associated with the application to a destination server;
receiving incoming traffic from the destination server; and
communicating the incoming traffic to the host server.

5. The first router of claim 1, the operations further comprising:
determining that second SLA characteristics for a second router fail to satisfy the SLA requirements; and
lowering the FHRP priority of the first router such that the FHRP priority of the first router and the FHRP priority of the second router are set to a same value.

6. The first router of claim 1, wherein:
the SLA requirements comprise threshold values for jitter, latency, and packet loss; and
the first SLA characteristics comprise performance metrics associated with jitter, latency, and packet loss.

7. The first router of claim 1, wherein:
the network is a software-defined wide area network (SD-WAN);
the FHRP priority is a Virtual Router Redundancy Protocol (VRRP) priority; and
the first router is located in a data center.

8. A method, comprising:
determining, by a first router within a network, service level agreement (SLA) requirements for an application;
determining, by the first router, first SLA characteristics for the first router;
determining, by the first router, that the first SLA characteristics for the first router fail to satisfy the SLA requirements; and
determining, by the first router and in response to determining that the first SLA characteristics for the first router fail to satisfy the SLA requirements, to lower a first hop redundancy protocol (FHRP) priority of the first router.

9. The method of claim 8, further comprising:
determining that second SLA characteristics for a second router satisfy the SLA requirements;
lowering the FHRP priority of the first router such that the FHRP priority of the first router is less than the FHRP priority of the second router; and
switching, based on the FHRP priority of the first router and the second router, the first router from an active mode to a standby mode within the network.

10. The method of claim 9, further comprising:
determining that transport location (TLOC) extensions are configured between the first router and the second router;
determining to switch, based on the FHRP priority of the first router being less than the FHRP priority of the second router, the second router from the standby mode to the active mode within the network; and
determining to increase a TLOC preference for the second router.

11. The method of claim 8, further comprising, while the first router is in an active mode:
receiving outgoing traffic associated with the application from a host server;
communicating the outgoing traffic associated with the application to a destination server;
receiving incoming traffic from the destination server; and
communicating the incoming traffic to the host server.

12. The method of claim 8, further comprising:
determining that second SLA characteristics for a second router fail to satisfy the SLA requirements; and
lowering the FHRP priority of the first router such that the FHRP priority of the first router and the FHRP priority of the second router are set to a same value.

13. The method of claim 8, wherein:
the SLA requirements comprise threshold values for jitter, latency, and packet loss; and
the first SLA characteristics comprise performance metrics associated with jitter, latency, and packet loss.

14. The method of claim 8, wherein:
the network is a software-defined wide area network (SD-WAN);
the FHRP priority is a Virtual Router Redundancy Protocol (VRRP) priority; and
the first router is located in a data center.

15. One or more computer-readable non-transitory storage media embodying instructions that, when executed by a processor, cause the processor to perform operations comprising:
- determining service level agreement (SLA) requirements for an application;
- determining first SLA characteristics for a first router within a network;
- determining that the first SLA characteristics for the first router fail to satisfy the SLA requirements; and
- determining, in response to determining that the first SLA characteristics for the first router fail to satisfy the SLA requirements, to lower a first hop redundancy protocol (FHRP) priority of the first router.

16. The one or more computer-readable non-transitory storage media of claim 15, the operations further comprising:
- determining that second SLA characteristics for a second router satisfy the SLA requirements;
- lowering the FHRP priority of the first router such that the FHRP priority of the first router is less than the FHRP priority of the second router; and
- switching, based on the FHRP priority of the first router and the second router, the first router from an active mode to a standby mode within the network.

17. The one or more computer-readable non-transitory storage media of claim 16, the operations further comprising:
- determining that transport location (TLOC) extensions are configured between the first router and the second router;
- determining to switch, based on the FHRP priority of the first router being less than the FHRP priority of the second router, the second router from the standby mode to the active mode within the network; and
- determining to increase a TLOC preference for the second router.

18. The one or more computer-readable non-transitory storage media of claim 17, the operations further comprising, while the first router is in an active mode:
- receiving outgoing traffic associated with the application from a host server;
- communicating the outgoing traffic associated with the application to a destination server;
- receiving incoming traffic from the destination server; and
- communicating the incoming traffic to the host server.

19. The one or more computer-readable non-transitory storage media of claim 18, the operations further comprising:
- determining that second SLA characteristics for a second router fail to satisfy the SLA requirements; and
- lowering the FHRP priority of the first router such that the FHRP priority of the first router and the FHRP priority of the second router are set to a same value.

20. The one or more computer-readable non-transitory storage media of claim 19, wherein:
- the SLA requirements comprise threshold values for jitter, latency, and packet loss; and the first SLA characteristics comprise performance metrics associated with jitter, latency, and packet loss.

* * * * *